J. GILSON, Sr.
GARDEN TOOL.
APPLICATION FILED JULY 26, 1915.
1,224,630.
Patented May 1, 1917.
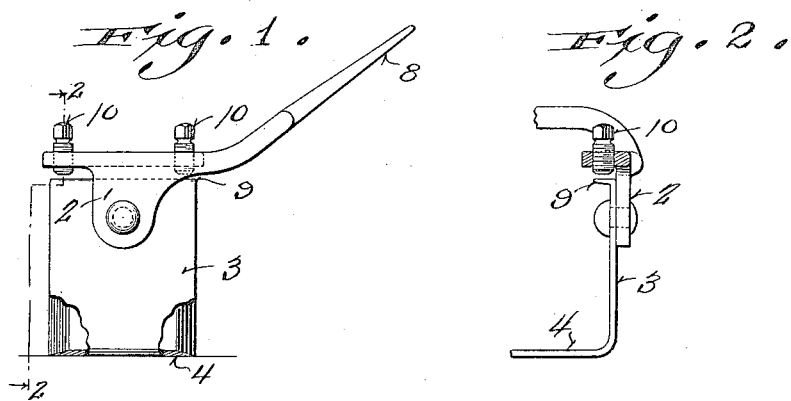

UNITED STATES PATENT OFFICE.

JOHN GILSON, SR., OF PORT WASHINGTON, WISCONSIN.

GARDEN-TOOL.

1,224,630.

Specification of Letters Patent.

Patented May 1, 1917.

Application filed July 26, 1915. Serial No. 41,975.

*To all whom it may concern:*

Be it known that I, JOHN GILSON, Sr., a citizen of the United States, and resident of Port Washington, in the county of Ozaukee and State of Wisconsin, have invented certain new and useful Improvements in Garden-Tools; and I do hereby declare that the following is a full, clear, and exact description thereof.

This invention relates to the subject of garden tools, and more particularly to garden tools that are adapted for weeding purposes.

One of the objects of the invention is to produce a weeding tool that is formed of few parts, the parts being relatively arranged so that the tool will effectively cut the weeds in both its forward and rearward strokes, the cutting operations being performed by a blade having two cutting edges at its base and sides, the blade mounted within a head, and said blade and head being so connected, associated, and mutually coöperating to permit the blade to oscillate, yet preventing the oscillating movements of the blade being such that would cause the blade to swing in an inoperative position.

In addition to the foregoing prominent features, the invention in one of its embodiments contemplates equipping the tool head with rake teeth so that when the weeds are cut, they may be readily removed without requiring an additional tool, the teeth being directly carried by the head, thus producing a combination tool that embodies in its general organization simply the teeth, a head, a cutting blade, and a suitable handle.

Simple and practical embodiments of the invention are shown in the accompanying drawing wherein:

Figure 1 is a view in side elevation of another form of the invention.

Fig. 2 is a sectional view taken on the line 2—2, Fig. 1.

Referring to the accompanying drawings by numerals, it will be observed that the improved weeding tool comprises a flat head 1, having downturned ends 2, forming pivot ears to which the upper ends of the upstanding legs 3 of the substantially U shaped cutting blade 4 are pivoted. The upper edges of the legs 3 are preferably slightly rounded outwardly, so that when the blade 4 oscillates, such movements are restricted by contact of the rounded ends of legs 3 with the under surface of head 1. The rounded end edges of the legs are of special utility, as they form stops that will not bind when forced into contact with the head 1. The front and rear edges of the blade 4 including the base and the legs thereof, are sharpened so that the blade will cut in both its forward and rear strokes.

The upper ends of the legs of the blade are provided with inwardly projecting lateral flanges 9. The tool head at each end is equipped with forward and rear adjustable stops 10 for engaging flanges 9 to limit the oscillating movements of the blade. The stops 10 are preferably in the form of screws that can be manually adjusted to regulate the movements of the blade.

I claim:—

In a tool of the class described, the combination of a head member having downwardly extending end portions, a U-shaped blade member having its arms pivotally secured between the said end portions and having the free ends of said arms inwardly directed and members adjustably held by the head member for engagement with said inwardly turned end portions.

In testimony that I claim the foregoing I have hereunto set my hand at Milwaukee, in the county of Milwaukee and State of Wisconsin, in the presence of two witnesses.

JOHN GILSON, Sr.

Witnesses:
JOHN E. GILSON,
M. E. DOWNEY.

Copies of this patent may be obtained for five cents each, by addressing the "Commissioner of Patents, Washington, D. C."